United States Patent
Zhang et al.

(10) Patent No.: US 11,759,960 B2
(45) Date of Patent: Sep. 19, 2023

(54) OPTICAL WAVEGUIDE-TYPE SOFT PHOTOACTUATOR BASED ON OPTICAL MICRO/NANOFIBER

(71) Applicant: ZHEJIANG LAB, Hangzhou (CN)

(72) Inventors: Lei Zhang, Hangzhou (CN); Jianliang Xiao, Hangzhou (CN); Wenzhen Yang, Hangzhou (CN); Shuqi Ma, Hangzhou (CN); Ni Yao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/924,696

(22) PCT Filed: Nov. 2, 2021

(86) PCT No.: PCT/CN2021/128198
§ 371 (c)(1),
(2) Date: Feb. 1, 2023

(87) PCT Pub. No.: WO2023/005043
PCT Pub. Date: Feb. 2, 2023

(65) Prior Publication Data
US 2023/0191623 A1 Jun. 22, 2023

(51) Int. Cl.
*B25J 15/00* (2006.01)
*F03G 7/06* (2006.01)

(52) U.S. Cl.
CPC .............. *B25J 15/00* (2013.01); *F03G 7/0614* (2021.08); *F03G 7/0616* (2021.08)

(58) Field of Classification Search
CPC ........ B25J 15/00; F03G 7/0614; F03G 7/0616
(Continued)

(56) References Cited

U.S. PATENT DOCUMENTS

| | | | | |
|---|---|---|---|---|
| 5,632,841 A * | 5/1997 | Hellbaum | ............ | H10N 30/204 29/25.35 |
| 7,081,701 B2 * | 7/2006 | Yoon | .................... | H10N 30/204 310/369 |

(Continued)

FOREIGN PATENT DOCUMENTS

CN 110123336 A 8/2019
CN 110308514 A 10/2019
(Continued)

OTHER PUBLICATIONS

Jianliang Xiao, et al., Optical fibre taper-enabled waveguide photoactuators, Nature Communications, 2022, pp. 1-8, vol. 13, No. 363.

*Primary Examiner* — Hoang M Nguyen
(74) *Attorney, Agent, or Firm* — Bayramoglu Law Offices LLC

(57) ABSTRACT

An optical waveguide-type soft photoactuator based on an optical micro/nanofiber includes an optical micro/nanofiber, a first deformed material membrane, and a second deformed material membrane. One end of the optical micro/nanofiber is provided with a taper region and a waist region, and the taper region and the waist region are encapsulated in the first deformed material membrane. The second deformed material membrane covers a side of the first deformed material membrane, and the first deformed material membrane or the second deformed material membrane is doped with a photothermal conversion material. The refractive index of the first deformed material membrane is less than the refractive index of a core of the optical micro/nanofiber. The coefficient of thermal expansion of the first deformed material membrane and a coefficient of thermal expansion of the second deformed material membrane are different.

5 Claims, 3 Drawing Sheets

(58) Field of Classification Search
USPC .............................. 60/527–529; 310/305–307
See application file for complete search history.

(56) References Cited

U.S. PATENT DOCUMENTS

| | | | | |
|---|---|---|---|---|
| 10,481,691 | B2* | 11/2019 | Uttermann | .............. G06F 3/016 |
| 2019/0226449 | A1* | 7/2019 | Altmikus | ................ F03D 7/024 |
| 2020/0125227 | A1 | 4/2020 | Shin et al. | |
| 2020/0169195 | A1* | 5/2020 | Citro | .................... F03G 7/0616 |

FOREIGN PATENT DOCUMENTS

| | | |
|---|---|---|
| CN | 110426864 A | 11/2019 |
| KR | 20030043417 A | 6/2003 |

\* cited by examiner

OPTICAL WAVEGUIDE-TYPE SOFT PHOTOACTUATOR BASED ON OPTICAL MICRO/NANOFIBER

CROSS REFERENCE TO THE RELATED APPLICATIONS

This application is the national phase entry of International Application No. PCT/CN2021/128198, filed on Nov. 02, 2021, which is based upon and claims priority to Chinese Patent Application No. 202110870445.5, filed on Jul. 30, 2021, the entire contents of which are incorporated herein by reference.

TECHNICAL FIELD

The present invention relates to the design and preparation of a photoactuator, and more particularly, to an optical waveguide-type soft photoactuator based on an optical micro/nanofiber.

BACKGROUND

Soft actuators that can convert external stimuli into mechanical motions have great potential for many cutting-edge applications such as soft robots, artificial muscles, bionic motions, and object grasping. Various soft actuators driven by different stimuli such as magnetic field, electric field, temperature, and humidity have been widely reported. Among them, photoactuators driven by light have received special attention due to the ease of remote control and the ability to transmit over a long distance, as well as the adjustability of parameters, such as wavelength, intensity, and polarization.

The majority of the photoactuators in previous studies are triggered by free spatial light, which means that there must be a straight light path between the light source and the actuator, and the use of the actuator is greatly limited for situations where the actuator is susceptible to being blocked. Moreover, during the long-distance transmission, the intensity of free spatial light may be significantly reduced due to scattering and absorption by the ambient medium, affecting the drive efficiency of the actuator. The use of optical waveguides to transmit light into the actuator is an effective strategy to overcome these limitations because light can be transmitted over a long distance through optical waveguides, avoiding the blocking of the transmission path and the energy loss during transmission.

However, there is a lack of research on optical waveguide-type actuators, and the optical waveguide materials used in the reported optical waveguide-type actuators are mostly commercial optical fibers with large dimensions (>100 μm), resulting in the actuator having a large thickness and high probability of a mismatch between the large actuator and the size of the photo-responsive material that reduces energy utilization. Thus, the optical waveguide-type actuators in the prior art possess small deformation amplitude and long response time and are difficult to meet the needs of practical use. Therefore, the development of optical waveguide-type actuators with large deformation capability is of important scientific and application value, and innovation of structural design of the actuator is needed.

SUMMARY

In order to solve the problems in the background, an objective of the present invention is to provide an optical waveguide-type soft photoactuator based on an optical micro/nanofiber. The present invention can overcome the defects that the spatial light-type actuator is easily restricted by the environment and has the advantages of large deformation amplitude and fast response, which can be applied in fields, such as soft robots, intelligent grasping, in-vivo surgeries.

The objective of the present invention is achieved by the following technical solutions:

The optical waveguide-type soft photoactuator based on the optical micro/nanofiber includes an optical micro/nanofiber, a first deformed material membrane, and a second deformed material membrane. One end of the optical micro/nanofiber is provided with a taper region and a waist region, and the taper region and the waist region are encapsulated in the first deformed material membrane. The second deformed material membrane covers a side of the first deformed material membrane, and the first deformed material membrane or the second deformed material membrane is doped with a photothermal conversion material. The refractive index of the first deformed material membrane is less than the refractive index of the core of the optical micro/nanofiber, which can reduce the light leakage in the taper region of the optical micro/nanofiber and reduce the transmission loss. The coefficient of thermal expansion of the first deformed material membrane and the coefficient of thermal expansion of the second deformed material membrane are different.

The waist region of the optical micro/nanofiber is a section of the fiber diameter smaller than the initial normal diameter, that is, the stretched section. The waist region is generally obtained by stretching. The taper region is a section connected between the waist region and the normal diameter section, has the gradually changed diameter, and is typically conical.

An unstretched section of the optical micro/nanofiber is encapsulated in the first deformed material membrane, which can improve stability.

The unstretched section of the optical micro/nanofiber is a section with a diameter that is the same as the initial normal diameter.

The other end of the optical micro/nanofiber is connected to a light source.

A method for preparing the soft photoactuator includes:

spin-coating polydimethylsiloxane (PDMS) prepolymer on a substrate and curing to obtain a PDMS membrane, preparing the optical micro/nanofiber 1 by heating and stretching to form the conical taper region and the waist region, immobilizing the optical micro/nanofiber 1 on the prepared PDMS membrane, and subsequently casting the PDMS prepolymer again on the optical micro/nanofiber 1 and curing to obtain the first deformed material membrane 2 with the optical micro/nanofiber 1 encapsulated, so that the entire taper region and waist region, and part of the unstretched section of the optical micro/nanofiber 1 are encapsulated in the first deformed material membrane 2;

dispersing gold nanorods (AuNR) in graphene oxide (GO) suspension to obtain GO/AuNR suspension; then performing plasma treatment on the first deformed material membrane 2, subsequently coating the GO/AuNR suspension on a surface of the first deformed material membrane 2 after the plasma treatment, and drying to obtain the second deformed material membrane 3; and peeling off the first deformed material membrane 2 and the second deformed material membrane 3 as a whole from the substrate, and cutting to the desired size to obtain the soft photoactuator based on the optical micro/nanofiber.

The concentration of the GO suspension is 1-5 mg/mL.

The optical micro/nanofiber 1 is prepared by heating and stretching to form the conical taper region and the waist region. Specifically, by heating and stretching the two ends of the optical micro/nanofiber 1, the middle section's diameter of the optical micro/nanofiber 1 is stretched and elongated, resulting in a reduced diameter to occur during deformation, thereby forming the waist region, and the taper region on both sides of the waist region. Then, the middle of the waist region is cut off, or the middle of the waist region is continuously stretched and elongated, so that the middle thinnest part of the waist region is stretched to snap.

Compared with the prior art, the advantages of the present invention are as follows:
1. By adopting light in waveguides for driving, the present invention overcomes the defects that the spatial light-type actuators are easily blocked, difficult to be precisely operated for remote control, and difficult to be applied in narrow space.
2. The small diameter of the optical micro/nanofiber can greatly increase the energy density, significantly improve the drive efficiency, and reduce the drive energy consumption.
3. The optical micro/nanofiber is completely encapsulated in the deformed material, which can channel all the transmitted light into the deformed material and improve the energy utilization.
4. The prepared optical waveguide-type actuator has a large deformation angle and a fast response speed.

In the figures, 1—optical micro/nanofiber, 2—first deformed material membrane, 3—second deformed material membrane, and 4—light source.

DETAILED DESCRIPTION OF THE EMBODIMENTS

The present invention is described in further detail below in conjunction with the drawings and specific embodiments.

Embodiments of the present invention are as follows:

Embodiment I

Figure 1:
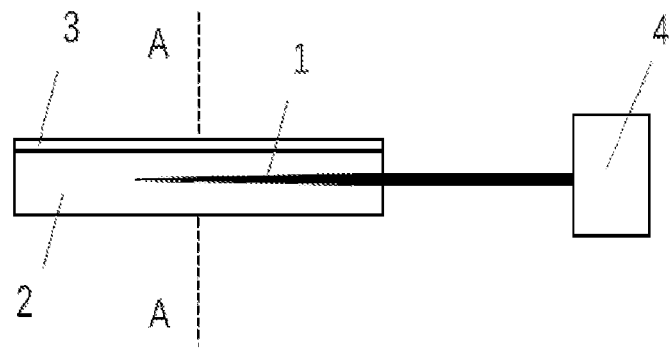
FIG. 1 is a schematic diagram of the structure of a photoactuator including two layers of deformed material.
Figure 2:
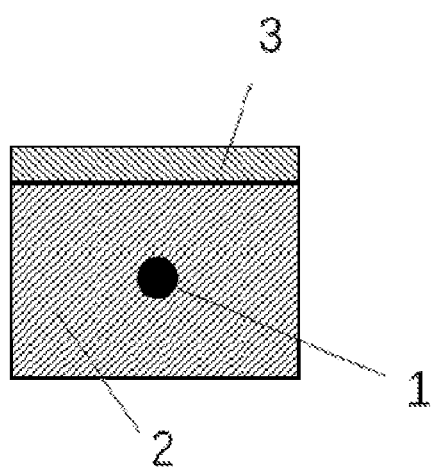
FIG. 2 is an A-A cross-sectional view of FIG. 1.

The structure and preparation method of an optical waveguide-type soft photoactuator based on an optical micro/nanofiber of the present invention, and its deformation mechanism, are illustrated below by the embodiment shown in FIGS. 1 and 2. The photoactuator of this embodiment includes an optical micro/nanofiber and two layers of deformed material.

A PDMS prepolymer is spin-coated on a glass substrate and cured at 80° C. for 30 minutes to obtain a PDMS membrane. The optical micro/nanofiber 1 with a single cone structure is prepared by heating and stretching to form a conical taper region and a waist region, and the optical micro/nanofiber 1 is immobilized on the prepared PDMS membrane. Subsequently, the PDMS prepolymer is cast again on the optical micro/nanofiber 1 and cured at 80° C. for 30 minutes to obtain the first deformed material membrane 2 with the optical micro/nanofiber 1 encapsulated.

The entire taper region and waist region, and part of an unstretched section of the optical micro/nanofiber 1 are encapsulated in the first deformed material membrane 2.

AuNR is dispersed in GO suspension (1-5 mg/mL) to obtain GO/AuNR suspension. The first deformed material membrane 2 is subjected to plasma treatment, and subsequently the GO/AuNR suspension is coated on the surface of the first deformed material membrane 2 and dried at 50° C. to obtain the second deformed material membrane 3. The sample is peeled off from the substrate and cut to the desired size to obtain the photoactuator based on the optical micro/nanofiber.

Figure 3:
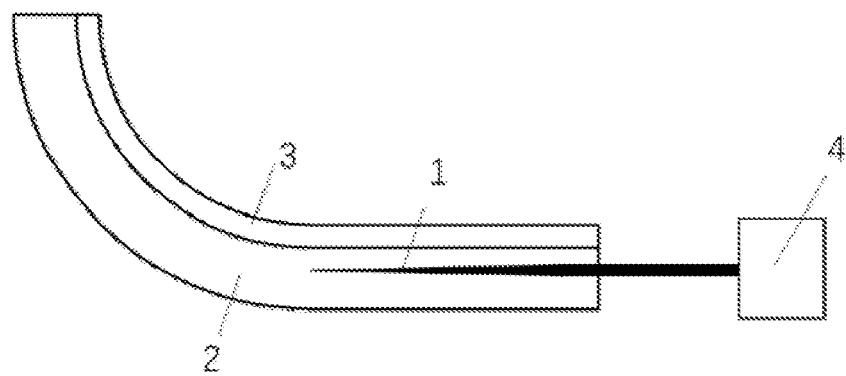
FIG. 3 is a schematic diagram of the deformation state of the soft photoactuator of the present invention.

When the photoactuator works, the unencapsulated end of the optical micro/nanofiber 1 is connected to the light source 4, and light enters the first deformed material membrane 2 through the optical micro/nanofiber 1 and propagates to the second deformed material membrane 3. The AuNR in the second deformed material membrane 3 converts the light into heat to increase the temperature. Since the first deformed material membrane 2 has a higher coefficient of thermal expansion than the second deformed material membrane 3, and the optical micro/nanofiber 1 has a certain stiffness, the photoactuator is bent towards the side near the second deformed material membrane 3 and deformation occurs, that is, the deformation of bending upward, as shown in FIG. 3.

In the present embodiment, the light emitted from the optical micro/nanofiber 1 will heat the area of the first deformed material membrane 2 and the second deformed material membrane 3 without the optical micro/nanofiber, which can effectively drive the overall actuator to deform.

Embodiment II

The structure and preparation method of an optical waveguide-type soft photoactuator based on an optical micro/nanofiber of the present invention, and its deformation mechanism, are illustrated below by the embodiment shown in FIGS. 1 and 2. The photoactuator of this embodiment includes an optical micro/nanofiber and two layers of deformed material.

Polyethylene glycol (PEG)-modified AuNR is dispersed in PDMS prepolymer, subsequently spin-coated on a glass substrate, and cured at 80° C. for 30 minutes to obtain a PDMS/AuNR membrane. The optical micro/nanofiber 1 with a single cone structure is prepared by heating and stretching to form a conical taper region and a waist region, and the optical micro/nanofiber 1 is immobilized on the prepared PDMS/AuNR membrane. Subsequently, the PDMS/AuNR prepolymer is cast again on the optical micro/nanofiber 1 and cured at 80° C. for 30 minutes to obtain the first deformed material membrane 2 with the optical micro/nanofiber 1 encapsulated. The entire taper region and waist region, and part of an unstretched section of the optical micro/nanofiber 1 are encapsulated in the first deformed material membrane 2. The first deformed material membrane 2 is subjected to plasma treatment, and subsequently GO suspension (1-5 mg/mL) is coated on the surface of the first deformed material membrane 2 and dried at 50° C. to obtain the second deformed material membrane 3. The sample is peeled off from the substrate and cut to the desired size to obtain the photoactuator based on the optical micro/nanofiber.

When the photoactuator works, the unencapsulated end of the optical micro/nanofiber 1 is connected to the light source 4, and light enters the first deformed material membrane 2 through the optical micro/nanofiber 1, where the AuNR converts the light into heat to increase the temperature. Since the first deformed material membrane 2 has a higher coefficient of thermal expansion than the second deformed material membrane 3, the photoactuator is bent towards the side near the second deformed material membrane 3 and deformation occurs, that is, the deformation of bending upward, as shown in FIG. 3.

Embodiment III

The structure and preparation method of an optical waveguide-type soft photoactuator based on an optical micro/nanofiber of the present invention, and its deformation mechanism, are illustrated below by the embodiment shown in FIGS. 1 and 2. The photoactuator of this embodiment includes an optical micro/nanofiber and two layers of deformed material.

Polyvinylidene fluoride-co-hexafluoropropylene (PVDF-HFP) is dissolved in dimethyl formamide (DMF) to form a solution with a concentration of 10-20%. Subsequently, the solution is spin-coated on a glass substrate and the solvent is evaporated at 80° C. to obtain a PVDF-HFP membrane. The optical micro/nanofiber 1 with a single cone structure is prepared by heating and stretching to form a conical taper region and a waist region, and the optical micro/nanofiber 1 is immobilized on the prepared PVDF-HFP membrane. Subsequently, the PVDF-HFP solution is cast again on the optical micro/nanofiber 1. After the solvent is evaporated at 80° C., the first deformed material membrane 2 with the optical micro/nanofiber 1 encapsulated is obtained.

The entire taper region and waist region, and part of an unstretched section of the optical micro/nanofiber 1 are encapsulated in the first deformed material membrane 2.

AuNR is dispersed in GO suspension (1-5 mg/mL) to obtain GO/AuNR suspension. The first deformed material membrane 2 is subjected to plasma treatment, and subsequently the GO/AuNR suspension is coated on the surface of the first deformed material membrane 2 and dried at 50° C. to obtain the second deformed material membrane 3. The sample is peeled off from the substrate and cut to the desired size to obtain the photoactuator based on the optical micro/nanofiber.

When the photoactuator works, the unencapsulated end of the optical micro/nanofiber 1 is connected to the light source 4, and light enters the first deformed material membrane 2 through the optical micro/nanofiber 1 and propagates to the second deformed material membrane 3. The AuNR in the second deformed material membrane 3 converts the light into heat to increase the temperature of the AuNR. Since the first deformed material membrane 2 has a higher coefficient of thermal expansion than the second deformed material membrane 3, and the optical micro/nanofiber 1 has a certain stiffness, the photoactuator is bent towards the side near the second deformed material membrane 3 and deformation occurs, that is, the deformation of bending upward, as shown in FIG. 3.

Figure 4:
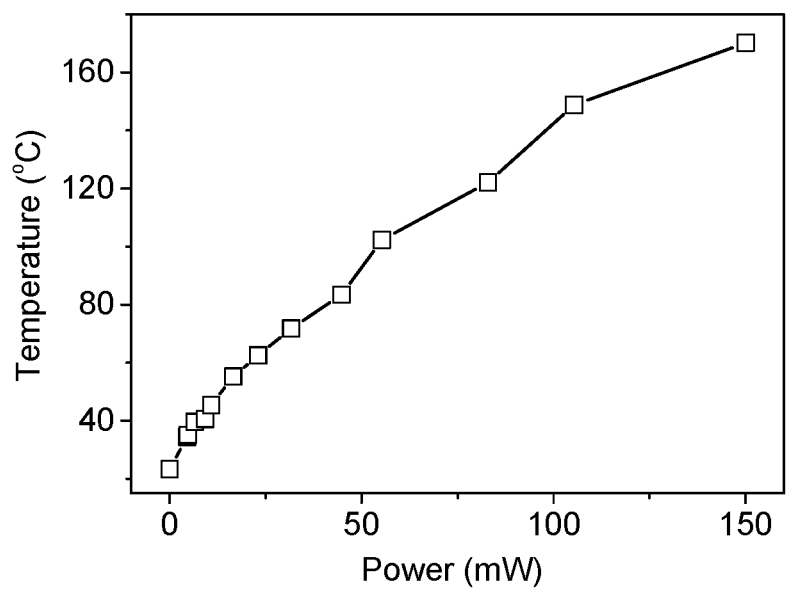
FIG. 4 is a schematic diagram showing the variation of the temperature on the surface of the actuator with respect to the laser power when the soft photoactuator described in Embodiment II works.
Figure 5:
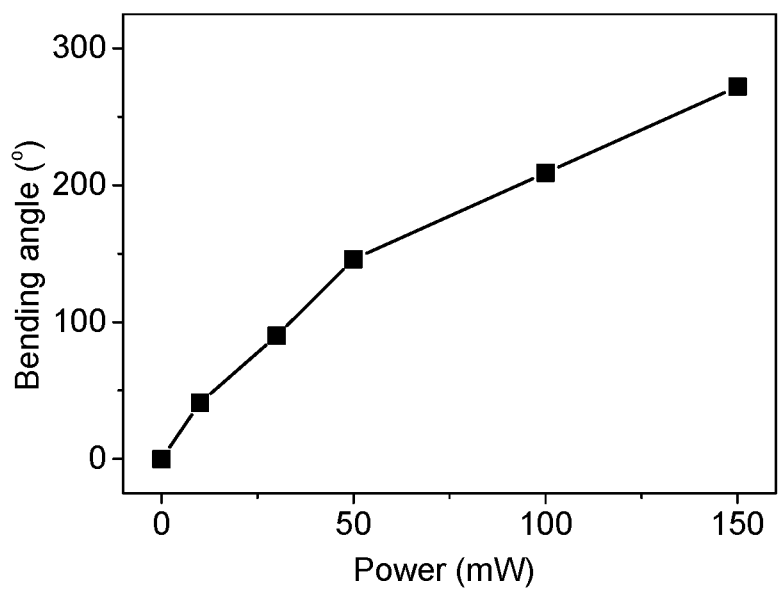
FIG. 5 is a schematic diagram showing the variation of the deformation angle with respect to the laser power when the soft photoactuator described in Embodiment II works.
Figure 6:
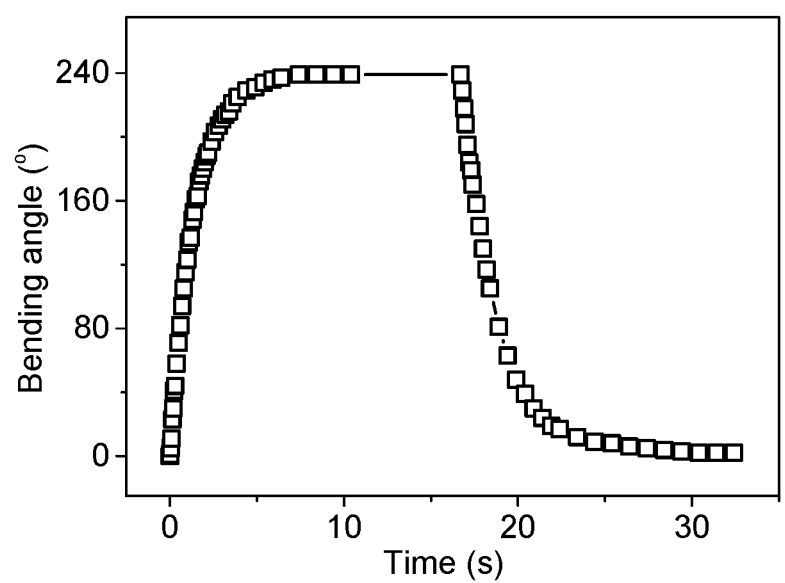
FIG. 6 is a schematic diagram showing the dynamic variation of the deformation angle with time when the soft photoactuator described in Embodiment II works at a predetermined laser power.

When the soft photoactuator described in Embodiment II works, the variation of the temperature of the surface of the actuator with laser power is shown in FIG. 4. When the soft photoactuator described in Embodiment II works, the variation of the deformation angle with laser power is shown in FIG. 5. When the soft photoactuator described in Embodiment II works at a predetermined laser power, the dynamic variation of the deformation angle with time is shown in FIG. 6.

What is claimed is:

1. An optical waveguide-type soft photoactuator based on an optical micro/nanofiber, comprising an optical micro/nanofiber, a first deformed material membrane, and a second deformed material membrane; wherein
    one end of the optical micro/nanofiber is provided with a taper region and a waist region, and the taper region and the waist region are encapsulated in the first deformed material membrane;
    the second deformed material membrane covers a side of the first deformed material membrane;
    the first deformed material membrane or the second deformed material membrane is doped with a photothermal conversion material;
    a refractive index of the first deformed material membrane is less than a refractive index of a core of the optical micro/nanofiber; and
    a coefficient of thermal expansion of the first deformed material membrane and a coefficient of thermal expansion of the second deformed material membrane are different;
    wherein the waist region of the optical micro/nanofiber is a section of a fiber diameter smaller than an initial normal diameter of the optical micro/nanofiber, that is, a stretched section; and the taper region of the optical micro/nanofiber is a section connected between the waist region and an initial normal diameter section of the optical micro/nanofiber and has a gradually changed diameter.

2. The optical waveguide-type soft photoactuator according to claim 1, wherein an unstretched section of the optical micro/nanofiber is encapsulated in the first deformed material membrane, wherein the unstretched section of the optical micro/nanofiber is a section with a diameter that is the same as the initial normal diameter of the optical micro/nanofiber.

3. The optical waveguide-type soft photoactuator according to claim 1, wherein the other end of the optical micro/nanofiber is connected to a light source.

4. The optical waveguide-type soft photoactuator according to claim 1, wherein a method for preparing the optical waveguide-type soft photoactuator comprises:
    spin-coating polydimethylsiloxane (PDMS) prepolymer on a substrate and curing to obtain a PDMS membrane, preparing the optical micro/nanofiber by heating and stretching to form the taper region and the waist region, immobilizing the optical micro/nanofiber on the prepared PDMS membrane, and subsequently casting the PDMS prepolymer again on the optical micro/nanofiber and curing to obtain the first deformed material membrane with the optical micro/nanofiber encapsulated;
    dispersing gold nanorods (AuNR) in graphene oxide (GO) suspension to obtain GO/AuNR suspension; then performing plasma treatment on the first deformed material membrane, subsequently coating the GO/AuNR suspension on a surface of the first deformed material membrane after the plasma treatment, and drying to obtain the second deformed material membrane; and
    peeling off the first deformed material membrane and the second deformed material membrane as a whole from the substrate, and cutting to a desired size to obtain the optical waveguide-type soft photoactuator based on the optical micro/nanofiber.

5. The optical waveguide-type soft photoactuator according to claim 4, wherein a concentration of the GO suspension is 1-5 mg/mL.

\* \* \* \* \*